United States Patent
Plas et al.

(10) Patent No.: US 8,180,036 B2
(45) Date of Patent: May 15, 2012

(54) METHOD AND APPARATUS FOR ACCESSING MISSED CALL INFORMATION

(75) Inventors: Dirk-Jaap Plas, Enschede (NL); Jeroen van Bemmel, Enschede (NL); Harold Teunissen, Deventer (NL)

(73) Assignee: Alcatel Lucent, Paris (FR)

( * ) Notice: Subject to any disclaimer, the term of this patent is extended or adjusted under 35 U.S.C. 154(b) by 1105 days.

(21) Appl. No.: 10/955,150

(22) Filed: Sep. 30, 2004

(65) Prior Publication Data

US 2006/0067498 A1    Mar. 30, 2006

(51) Int. Cl.
*H04M 3/42*    (2006.01)

(52) U.S. Cl. ......... 379/207.08; 379/201.01; 379/201.02; 379/201.07; 379/201.1; 370/352; 455/445; 455/466; 455/565

(58) Field of Classification Search ............. 379/142.01, 379/201.01, 201.02, 201.07, 201.1, 207.08; 370/352; 455/455, 466, 566

See application file for complete search history.

(56) References Cited

U.S. PATENT DOCUMENTS

| | | | |
|---|---|---|---|
| 6,169,795 B1 * | 1/2001 | Dunn et al. | 379/209.01 |
| 6,282,275 B1 | 8/2001 | Gurbani et al. | |
| 6,920,211 B2 * | 7/2005 | Pelletier et al. | 379/201.05 |
| 7,266,185 B2 * | 9/2007 | Trandal et al. | 379/142.02 |
| 7,436,942 B2 * | 10/2008 | Hakala et al. | 379/114.22 |
| 2003/0081753 A1 * | 5/2003 | Trandal et al. | 379/210.01 |
| 2003/0215078 A1 * | 11/2003 | Brahm et al. | 379/211.02 |
| 2005/0053221 A1 * | 3/2005 | Reding et al. | 379/211.02 |
| 2005/0059384 A1 * | 3/2005 | Kuusinen et al. | 455/414.1 |
| 2005/0180553 A1 * | 8/2005 | Moore | 379/142.01 |
| 2006/0062205 A1 * | 3/2006 | Doherty et al. | 370/352 |

FOREIGN PATENT DOCUMENTS

WO    WO 2005027485 A1 *    3/2005

* cited by examiner

*Primary Examiner* — Ahmad Matar
*Assistant Examiner* — Khai N Nguyen
(74) *Attorney, Agent, or Firm* — Wall & Tong, LLP

(57) ABSTRACT

The invention comprises a method and apparatus for enabling missed call information to be accessed from a remote device via a packet network. Specifically, the method comprises receiving missed call information associated with a called party, storing the missed call information and transmitting the missed call information towards a remote device associated with the called party via a packet network.

13 Claims, 3 Drawing Sheets

METHOD AND APPARATUS FOR ACCESSING MISSED CALL INFORMATION

FIELD OF THE INVENTION

The invention relates to the field of communications networks and, more specifically, to the monitoring of missed phone calls.

BACKGROUND OF THE INVENTION

In general, people typically want to be accessible via a communications device; however, due to both technical and personal reasons, a person may not always be available to answer incoming phone calls. In such situations, it is useful to have a service that enables the person who missed the incoming phone call to see information associated with the missed call (e.g., caller name, caller phone number and the like). Such a service offers the person who missed the incoming call (i.e., the called party) an option to return the missed call.

The telecommunication systems of today commonly support two features that address a portion of this problem. One such feature is voicemail service, which provides the caller the option of leaving a message that is later used by the called party to return the missed call. A second feature is a missed call log device that maintains a list of incoming calls missed by the called party. Unfortunately, each of these existing features has serious drawbacks.

Voicemail services depend on the caller leaving a message, and the caller phone number is only known if the caller leaves the phone number as a portion of the message, or if the called party recognizes the caller's voice. Furthermore, voicemail services do not provide easy access to callback functionality. Missed call log devices (e.g., caller-ID devices, phone displays and the like) are terminal specific and do not work when the missed call log device is turned off. Furthermore, missed call log devices must be integrated into or co-located with the called device (i.e., the called party's phone). Although missed call log devices often offer callback functionality, callback may only be done through the same missed call log device.

As such, a need exists in the art for a method and apparatus for accessing missed call information from a variety of devices and locations.

SUMMARY OF THE INVENTION

Various deficiencies in the art are addressed by the present invention of a method and apparatus for enabling missed call information to be accessed from a remote device via a packet network. Specifically, the method comprises receiving missed call information associated with a called party, storing the missed call information and transmitting the missed call information towards a remote device associated with the called party via a packet network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) network architecture utilizing Session Initiation Protocol (SIP); however, the methodology of the invention can readily be applied to other networks and associated client devices. In general, the present invention provides a robust method for identifying missed calls, receiving and storing associated missed call information, and transmitting the missed call information towards a remote device. As such, the present invention enables users to easily access missed call information, and to return missed calls, from any device capable of accessing the Internet. Furthermore, in at least one embodiment, the invention obviates the need for a called party (callee) to manually dial a phone number in order to return a missed call.

Figure 1:
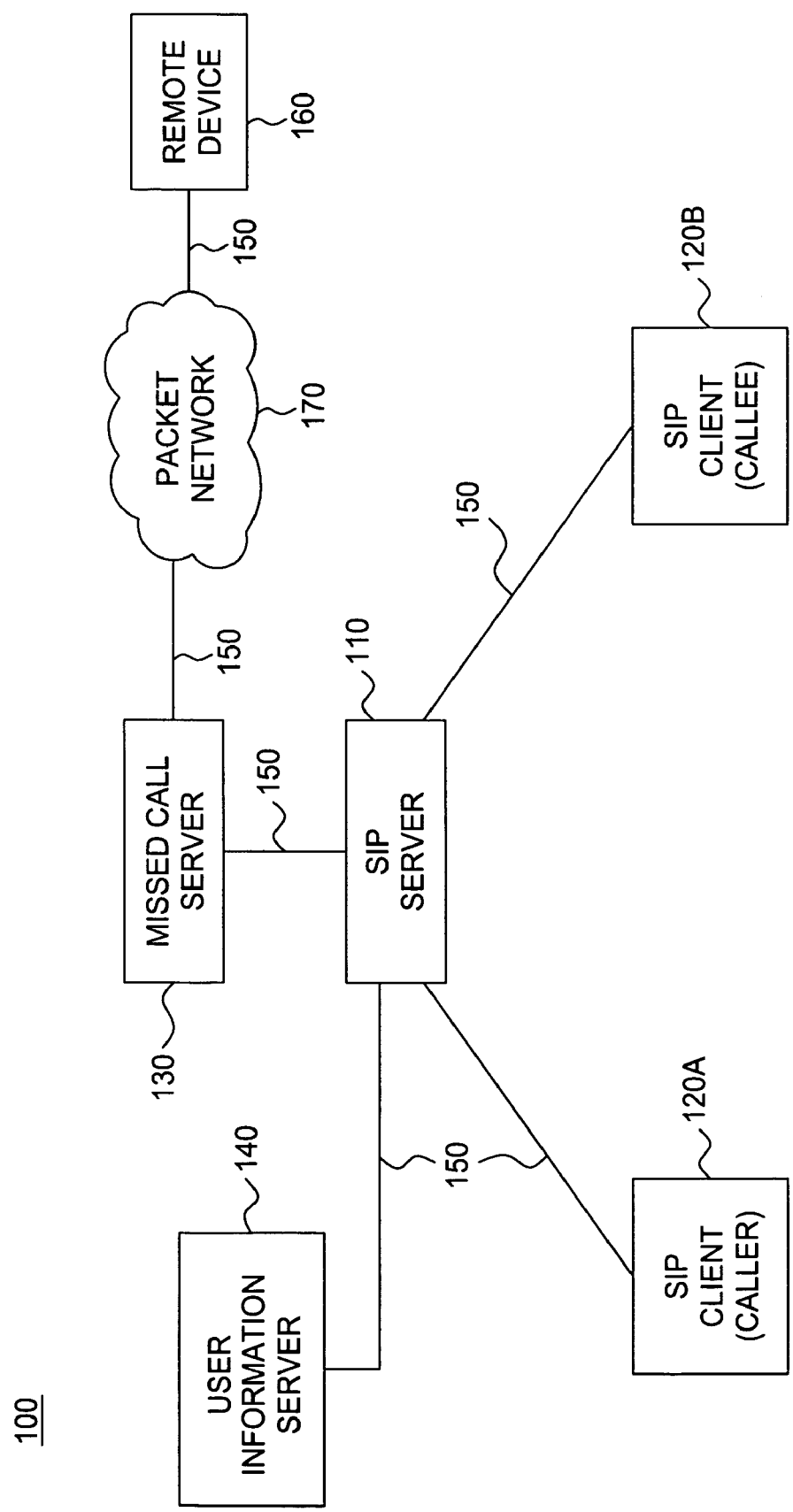
FIG. 1 depicts a high level block diagram of a network service architecture including a missed call server.

FIG. 1 depicts a high level block diagram of a network service architecture including a missed call server. Specifically, the network service architecture 100 of FIG. 1 comprises a SIP server 110, a caller SIP client 120A, a callee SIP client 120B, a missed call server 130, a user information server 140 and a remote device 160. The caller SIP client 120A, callee SIP client 120B, missed call server 130 and user information server 140 each communicate with SIP server 110 via respective communication links 150. Although depicted as directly connected to SIP server 110, those skilled in the art will appreciate that caller SIP client 120A, callee SIP client 120B, missed call server 130 and user information server 140 may communicate with SIP server 110 via additional network devices and associated communication links not depicted in FIG. 1.

The caller SIP client 120A and callee SIP client 120B (collectively, SIP clients 120) are end-user devices for initiating and receiving phone calls over the Internet and like networks capable of supporting SIP. In other words, the SIP clients 120 are IP phones, SIP phones, or any similar network device suitable for initiating and receiving calls over the Internet. The SIP clients 120 communicate with SIP server 110 using the SIP protocol. SIP is a request-response signaling protocol for establishing, modifying and terminating sessions (such as IP voice calls, multimedia conferences and the like) between a plurality of participants in an IP network.

The SIP server 110 is a voice-over-IP switching element that performs routing functions, such as determining the hop (e.g., a SIP client, a SIP proxy server, a SIP redirect server and the like) to which signaling should be relayed. As such, SIP server 110 mediates call establishment between SIP clients using the SIP protocol. In one embodiment, the SIP server 110 supports forking functionality, enabling a single call attempt to be routed to several SIP clients, either sequentially or in parallel. Although one SIP server is depicted and described with respect to FIG. 1, additional SIP servers (not depicted) may be required in order to establish a connection between SIP clients.

The user information server 140 stores user information, and provides user information to SIP server 110 in response to requests for the user information. In general, user information comprises both caller information and callee information. In the context of the present invention, caller information comprises information such as caller name, caller address, caller phone number and like caller information. In one embodiment, the callee information at least comprises an indication that the callee subscribes to the missed call information retrieval and callback service provided by the present invention.

The remote device 160 is a device capable of accessing the Internet, and communicates with missed call server 130 via packet network 170. As such, remote device 160 may be a computer, cell phone, personal data assistant (PDA), and any like device capable of accessing the Internet. The remote device 160 comprises a display through which a user (callee) can initiate a request to retrieve missed call information, and can then view the missed call information. Although a single remote device is depicted and described herein, those skilled in the art will appreciate that a large number of remote devices may communicate with missed call server 130 in order to retrieve missed call information.

The missed call server 130 receives missed call information from SIP server 110, and processes the missed call information for storage. The missed call server 130 communicates with SIP server 110 using the SIP protocol. The missed call server 130 transmits missed call information towards remote devices (illustratively, remote device 160). As described herein, the missed call server 130 communicates with the remote device 160 via the packet network 170 and associated communication links 150. In one embodiment, the missed call server 130 performs at least a portion of the methodologies of the present invention as depicted and described with respect to FIG. 2.

Figure 2:
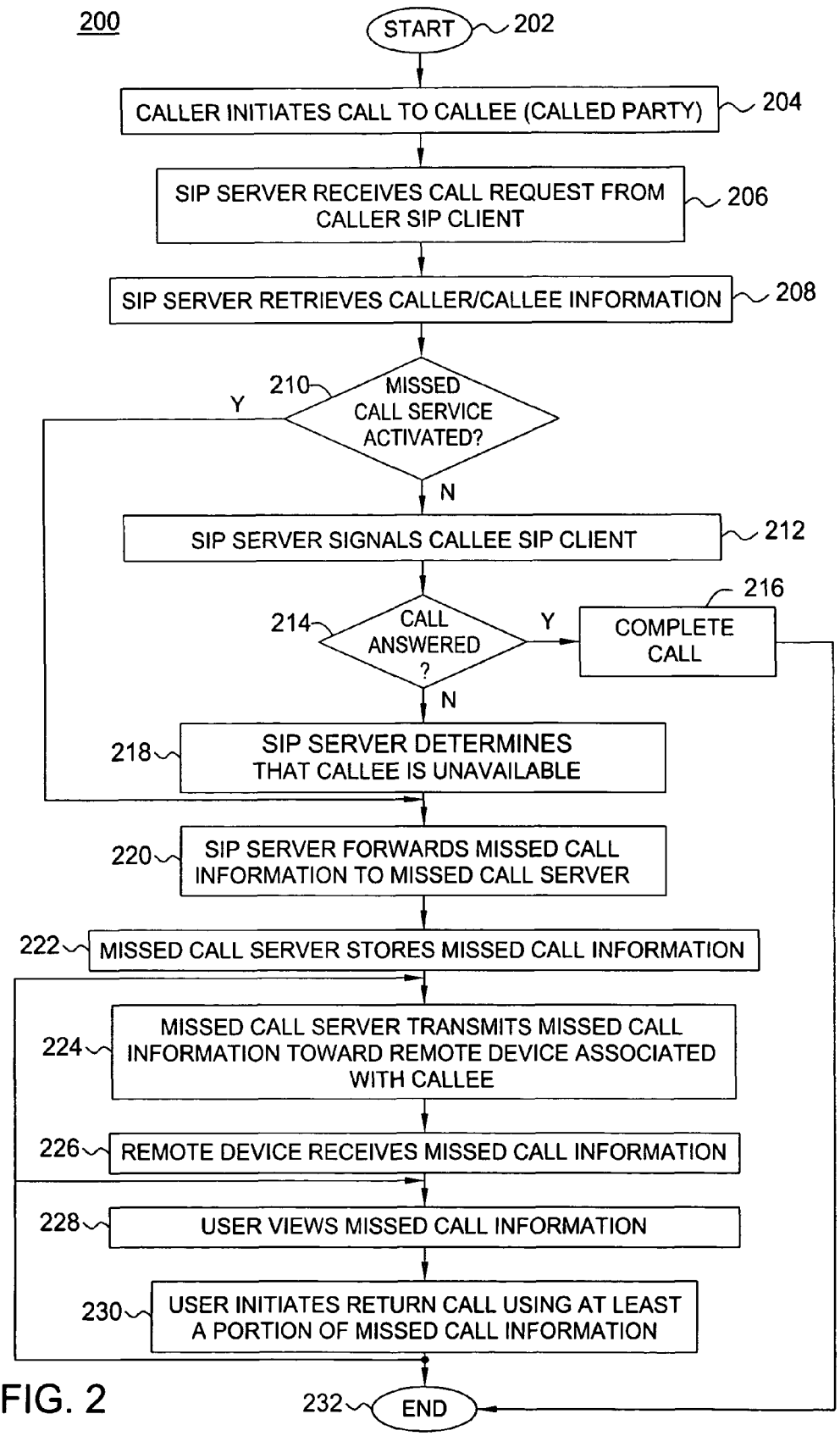
FIG. 2 depicts a flow diagram of a method according to one embodiment of the invention.

FIG. 2 depicts a flow diagram of a method according to one embodiment of the invention. Specifically, the method 200 of FIG. 2 comprises a method for receiving and storing missed call information, thereby enabling the missed call information to be accessed from a remote device via a packet network. The method 200 is entered at step 202 and proceeds to step 204.

At step 204, a caller initiates a phone call to a callee (called party). In one embodiment, the caller initiates the call using a SIP client, and the device to which the call is initiated is a SIP client. For example, as depicted in FIG. 1, caller SIP client 120A initiates a call to callee SIP client 120B using SIP server 110 to mediate the establishment of a connection between the SIP clients.

At step 206, the SIP server receives the call request from the caller SIP client. The SIP server processes the call request to determine the callee with which the caller is attempting to establish a connection. For example, as depicted in FIG. 1, SIP server 110 receives the call request from caller SIP client 120A from which the call was initiated. Upon receiving the call initiation request, SIP server 110 determines the SIP client for which the call is intended (illustratively, callee SIP client 120B).

At step 208, the SIP server retrieves caller information associated with the caller that initiated the call request, and retrieves callee information associated with the callee to which the call was initiated. The caller information and callee information is retrieved from at least one remote system or database in communication with the SIP server. For example, as depicted with respect to FIG. 1, the caller information and callee information is retrieved from user information server 140.

The retrieved caller information comprises at least one of caller name, caller address, caller phone number, and like information associated with the caller. The retrieved callee information comprises an indication of whether the callee is registered to use the missed call service functionality of the present invention. Although depicted as being performed prior to a determination that the callee is unavailable, retrieval of caller and callee information may be performed by the SIP server at any point prior to step 220.

At step 210, determine whether the missed call service is currently activated. In one embodiment, a callee is provided a capability to activate the missed call service such that all incoming calls (and associated missed call information) are logged according to the methodology of the present invention, regardless of whether the callee is available. Thus, manual activation of the missed call service by a callee ensures that all incoming calls are automatically logged as missed calls capable of being accessed by the callee as described herein.

As such, if the missed call service is activated, method 200 proceeds to step 220, at which point the SIP server forwards missed call information associated with a call to the missed call server. If the missed call service is not activated, the method 200 proceeds to step 212, at which the SIP server attempts to complete the call (signals the callee SIP client that there is an incoming call).

At step 212, the SIP server signals the associated callee SIP client to provide an indication of an incoming call (e.g., rings the phone). For example, as depicted with respect to FIG. 1, SIP server 110 signals callee SIP client 120B to notify the callee that there is an incoming call. At step 214, determine whether the call is answered by the callee. If the call is answered by the callee, method 200 proceeds to step 216, at which point the call from caller to callee is completed. At this point, since the call is not missed, method 200 proceeds to step 232 where the method 200 ends. If the call is not answered (for any of a variety of reasons) by the callee, the method 200 proceeds to step 218.

At step 218, the SIP server determines that the callee is unavailable (e.g., SIP server detects that callee does not answer the call, SIP server detects a busy signal, SIP server detects SIP errors, and like conditions). At step 220, upon determining that the callee is unavailable, the SIP server forwards missed call information to a missed call server. As such, the missed call information is received by missed call server 130 in response to an indication that a callee is unavailable. For example, as depicted in FIG. 1, SIP server 110 forwards missed call information to missed call server 130.

The missed call information comprises call information and caller information. The call information is determined by the SIP server and comprises call date, call time, call priority, call message and like information associated with the attempted call. In one embodiment, a call message comprises at least one of a text message, an audio message, a video message, and messages comprising combinations of text, audio and video information. In one embodiment, at least a portion of the call information (call date, call time and like information) is determined by missed call server 130.

As described above, the caller information is retrieved by SIP server 110 from user information server 140 and comprises caller name, caller address, caller phone number and like caller-specific information. In one embodiment, SIP server 110 initiates retrieval of the caller information from user information server 140 prior to signaling the callee SIP client that the caller is attempting to reach. In another embodiment, SIP server 110 initiates retrieval of the caller information from user information server 140 after determining that the callee is unavailable.

At step 222, the missed call server receives the missed call information, and processes the missed call information for storage. The missed call information received by the missed call server is stored in at least one local storage media (memory, database and like storage media as known in the art).

At step 224, the missed call server transmits at least a portion of the missed call information towards a remote device. The missed call information is transmitted via a packet network (illustratively, packet network 170). The missed call information is transmitted in response to a user request initiated via a user interface associated with the remote device. Those skilled in the art will appreciate that the actions required to initiate retrieval of the missed call information depend upon the type and design of the user interface. In one embodiment, a user must pass through at least one authentication portal (e.g., a login webpage requiring the user to enter a login and password) in order to access missed call information.

In one embodiment, retrieval of missed call information by a user is initiated using at least one point-and-click operation. Such an action returns all missed call information associated with the call, or a subset of the available missed call information. In other words, in one embodiment, the callee initiating the retrieval of missed call information has a capability to filter the missed call information to be retrieved. For example, the callee may request missed call information for all missed calls, all missed calls within a particular time period, missed calls initiated by a particular caller, and like scopes of missed call information.

In one embodiment, in which a callee is reachable at a plurality of phone numbers, the callee may access missed call information associated with missed calls received at each phone number at which the callee is reachable. In one such embodiment, a callee may filter missed call information based on the phone numbers at which the callee is reachable. As such, the missed call information associated with each of the numbers at which the callee is reachable may be displayed in a single view or split into a plurality of views.

In another embodiment, missed call information may be grouped based on criteria other than callee and callee phone numbers at which the missed calls are received. For example, missed call information may be grouped for a specific group of people, based on at least a portion of a SIP Uniform Resource Locator (URL), and like information. As such, grouping of missed calls may be performed based on information that is received as a portion of a SIP message, information that may be retrieved from the user information server, and information that may be derived from the network components depicted in FIG. 1.

At step 226, the remote device from which the retrieval of missed call information was initiated receives the requested missed call information from the missed call server. For example, as depicted in FIG. 1, remote device 160 receives the requested missed call information from missed call server 130 via the packet network 170. In one embodiment, the missed call information that is stored on missed call server 130 and transmitted towards the remote device is adaptable for display to a user interface.

At step 228, at least one user views the missed call information requested from the remote device via the user interface associated with the remote device. As described herein, the user interface comprises a display, such as a computer screen, cell phone display and like display devices. Those skilled in the art will appreciate that the format and scope of the missed call information displayed to a user depends upon the type of remote device, and the type and design of the associated user interface.

In one embodiment, the missed call information may be retrieved using a remote device capable of accessing the Internet, such that missed call information is accessible from any location having Internet access. In one such embodiment, in which the remote device is a mobile device having Internet access capabilities (such as a laptop computer, cell phone, and like mobile devices), a callee may access the missed call information from virtually any location.

At step 230, the user (callee) optionally initiates a return call using at least a portion of the missed call information displayed to the user via the remote device. In one embodiment, the return call is initiated without requiring the user to manually dial the caller phone number. As such, in one embodiment, the adaptation of missed call information for display to a user interface comprises adapting at least a portion of the missed call information such that the callee may return the call to the caller without having to manually dial the phone number.

In one such embodiment, the callee may initiate a return call to the caller by simply clicking a hyperlink. In this embodiment, the hyperlink by which the return call is initiated may be the caller name, caller phone number, and like missed call information. Although described with respect to clicking a hyperlink, those skilled in the art will appreciate that other methods of initiating a return call via the remote device may be employed, such as use of check boxes, radio buttons, and like means of submitting requests via a graphical user interface.

Since the retrieval of missed call information may be initiated in a variety of ways and using a variety of remote devices as described herein, step 228 and step 230 may be executed multiple times prior to the proceeding of method 200 to step 232 where the method 200 ends. Similarly, since the scope of missed call information that is retrieved may be tailored in a variety of ways as described herein, step 224 and step 226 may also be executed multiple times prior to the proceeding of method 200 to step 232 where the method 200 ends.

The methodology discussed above with respect to FIG. 2 may be divided into actions/functions performed by several functional elements. Specifically, a SIP server is described as performing actions/functions associated with steps 206, 208, 212 and 220, a SIP client is described as performing actions/functions associated with steps 204 and 218, a missed call server is described as performing actions/functions associated with steps 222 and 224, and a remote device is described as performing actions/functions associated with steps 226, 228, and 230.

It is contemplated by the inventors that some of the described actions/functions may be combined into fewer functional elements/devices. For example, the actions/functions associated with the SIP server and missed call server may be combined into one functional element or server. Similarly, it is contemplated by the inventors that various actions/functions may be performed by other functional elements or that the actions/functions may be distributed across the various functional elements in a different manner.

The architecture and methodologies of the present invention obviate the need for the remote device from which the missed call information is accessed to be co-located with the called device (illustratively, callee SIP client 120B). In one embodiment, depending on the type of remote device used by the callee to access the missed call information, the callee is provided with a capability to initiate a return call using the remote device from which the missed call information is accessed.

Figure 3:
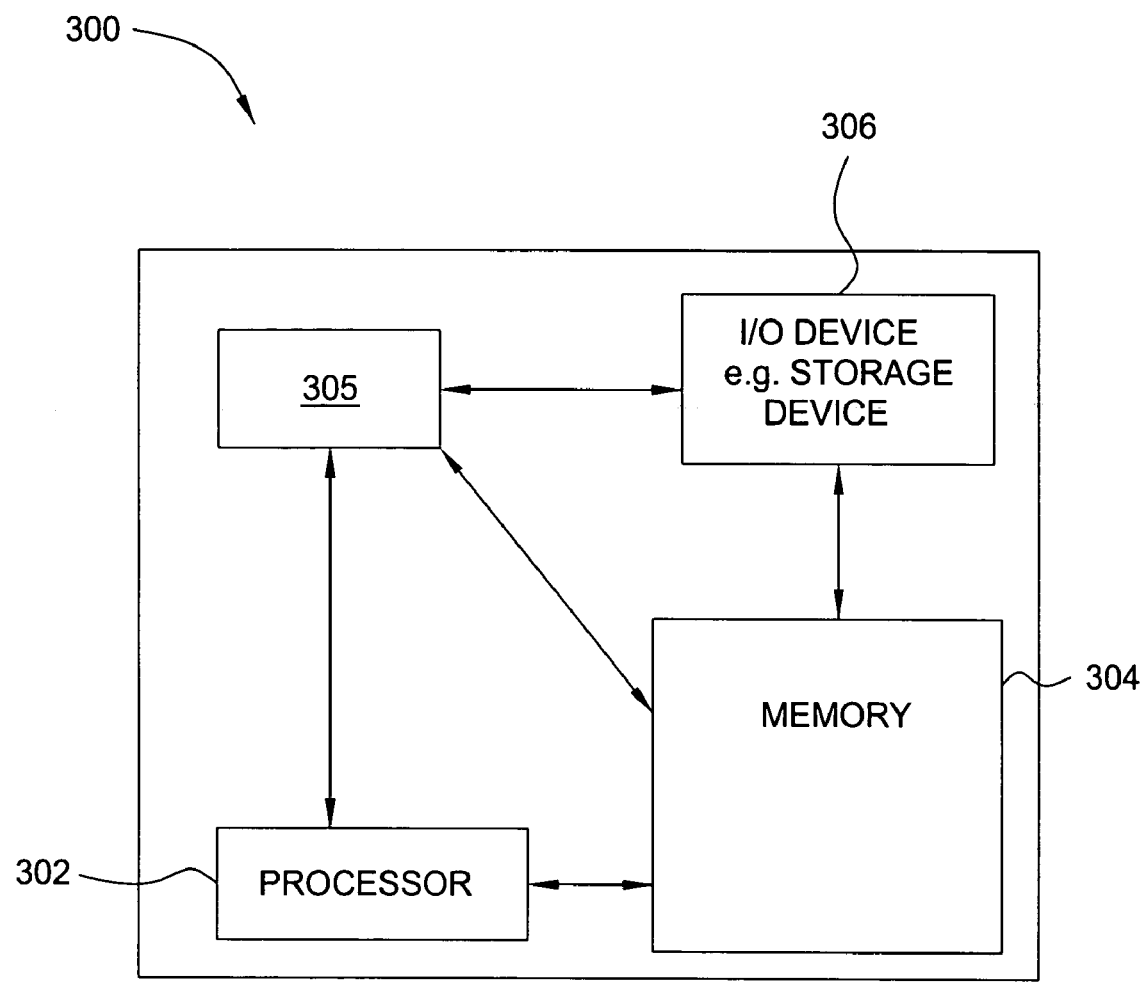
FIG. 3 depicts a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a missed call information access module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present missed call information access module or process 305 can be loaded into memory 304 and executed by processor 302 to implement the functions as discussed above. As such, the present missed call information access process 305 (including associated data structures) of the present invention can be stored on a computer readable medium or carrier, e.g., RAM memory, magnetic or optical drive or diskette and the like.

Although described herein with respect to a single caller placing a call to a single callee, the methodologies of the present invention may be extended for use in conferencing environments in which a plurality of callers initiate a call to a single callee, a single caller initiates a call to a plurality of callees, and a plurality of callers initiate a call to a plurality of callees. In each of these conferencing situations, the methodology of the present invention may be used by each of the unavailable callees to access the associated missed call information.

In one embodiment, the present invention is extendible for use with video conferencing capabilities. In one such embodiment, if the callee is unavailable, the caller may receive a video announcement informing the caller that the call is unavailable. In another embodiment, the caller may be provided an option to leave a video voicemail message that is stored as a portion of the missed call information. As with other missed call information described herein, the callee has an option to play the video voicemail message via an Internet-accessible remote device having video playback capabilities.

The present invention enables users to access missed call information that is accurate, informative, accessible and interactive. The missed call information is accurate in that it includes all callers that have attempted to contact the callee, not only the callers that leave message. The missed call information is informative in that it includes detailed missed call information such as caller name, caller phone number, call date, call time call priority and like missed call information. The missed call information is accessible in that it is available through any device capable of accessing the Internet (as opposed to only being available from the device that was called). The missed call information is interactive in that it is adaptable to provide the callee with a capability to return the missed call from any remote device without having to manually redial the caller phone number.

Although various embodiments which incorporate the teachings of the present invention have been shown and described in detail herein, those skilled in the art can readily devise many other varied embodiments that still incorporate these teachings.

What is claimed is:

1. A computer-implemented method for using a Session Initiation Protocol (SIP) server to provide missed call information for a call initiated from a caller to a callee, comprising:
   receiving, at the SIP server, SIP signaling indicative of a call request from a caller device of the caller to a callee device of the callee, wherein the caller device comprises a SIP client and the callee device comprises a SIP client, wherein the SIP server is configured for mediating call establishment between SIP clients;
   determining, by the SIP server, callee information associated with the callee, wherein the callee information comprises an indication as to whether a missed call service is activated for the callee;
   in response to at least one of an indication that the missed call service is activated for the callee and a determination that the callee is unavailable, determining, at the SIP server, missed call information for the call request, wherein the missed call information comprises call information associated with the call request and caller information associated with the caller, wherein determining the missed call information for the call request comprises:
      determining, by the SIP server, the call information associated with the call request; and
      retrieving, by the SIP server from at least one remote server, the caller information associated with the caller; and
   transmitting the missed call information from the SIP server toward a missed call server configured for storing the missed call information for the callee.

2. The computer-implemented method of claim 1, wherein the caller information comprises at least one of caller name, caller address, and caller phone number.

3. The computer-implemented method of claim 1, wherein the call information comprises at least one of a call date, a call time, a call priority, and a call message.

4. The computer-implemented method of claim 1, wherein the missed call information is adaptable for display to a user interface.

5. The computer-implemented method of claim 1, wherein the missed call information is adaptable for use in initiating a return call to the caller.

6. The computer-implemented method of claim 5, wherein the missed call information comprises a video message.

7. The computer-implemented method of claim 1, wherein the missed call information is transmitted using SIP signaling.

8. The computer-implemented method of claim 1, further comprising:
   receiving a request for at least a portion of the missed call information associated with the callee.

9. The computer-implemented method of claim 8, further comprising:
   retrieving at least a portion of the missed call information associated with the callee; and
   propagating, toward a remote device, the at least a portion of the missed call information associated with the callee.

10. The computer-implemented method of claim 1, wherein retrieving, by the SIP server from at least one remote server, the caller information associated with the caller comprises:
    initiating a request for caller information from the SIP server to at least one remote server; and
    receiving caller information from at least one remote server.

11. The computer-implemented method of claim 10, wherein the at least one remote server comprises a user information server.

12. An apparatus for using a Session Initiation Protocol (SIP) server to provide missed call information for a call initiated from a caller to a callee, comprising:
    a processor configured for:
       receiving, at the SIP server, SIP signaling indicative of a call request from a caller device of the caller to a callee device of the callee, wherein the caller device comprises a SIP client and the callee device comprises a SIP client, wherein the SIP server is configured for mediating call establishment between SIP clients;

determining, by the SIP server, callee information associated with the callee, wherein the callee information comprises an indication as to whether a missed call service is activated for the callee;

in response to at least one of an indication that the missed call service is activated for the callee and a determination that the callee is unavailable, determining, at the SIP server, missed call information for the call request, wherein the missed call information comprises call information associated with the call request and caller information associated with the caller, wherein determining the missed call information for the call request comprises:
  determining, by the SIP server, the call information associated with the call request; and
  retrieving, by the SIP server from at least one remote server, the caller information associated with the caller; and transmitting the missed call information from the SIP server toward a missed call server configured for storing the missed call information for the callee.

13. A non-transitory computer-readable storage medium storing instructions which, when executed by a computer, cause the computer to perform a method for using a Session Initiation Protocol (SIP) server to provide missed call information for a call initiated from a caller to a callee, the method comprising:

receiving, at the SIP server, SIP signaling indicative of a call request from a caller device of the caller to a callee device of the callee, wherein the caller device comprises a SIP client and the callee device comprises a SIP client, wherein the SIP server is configured for mediating call establishment between SIP clients;

determining, by the SIP server, callee information associated with the callee, wherein the callee information comprises an indication as to whether a missed call service is activated for the callee;

in response to at least one of an indication that the missed call service is activated for the callee and a determination that the callee is unavailable, determining, at the SIP server, missed call information for the call request, wherein the missed call information comprises call information associated with the call request and caller information associated with the caller, wherein determining the missed call information for the call request comprises:
  determining, by the SIP server, the call information associated with the call request; and
  retrieving, by the SIP server from at least one remote server, the caller information associated with the caller; and transmitting the missed call information from the SIP server toward a missed call server configured for storing the missed call information for the callee.

* * * * *